3,328,339
REINFORCED PLASTICS CONTAINING BASE TREATED, CALCINED PARTICULATE FILLERS AND ORGANOSILANE COUPLING AGENTS

Paul A. Tierney, St. Louis, Mo., assignor to Monsanto Company, St. Louis, Mo., a corporation of Delaware
No Drawing. Filed Aug. 28, 1963, Ser. No. 305,181
17 Claims. (Cl. 260—37)

This invention relates to inorganic minerals which can be chemically bound to polymers, thereby providing reinforced polymeric compositions. In one aspect, this invention relates to inorganic minerals which are rendered more suitable for chemical bonding to polymers through treatment of the mineral with a basic inorganic salt, oxide, or hydroxide. In another aspect, this invention relates to a process for treating inorganic minerals so that they can be coupled more readily to polymer molecules. In still another aspect, this invention relates to polymeric compositions reinforced with unique reinforcing agents and to the process for preparing reinforced polymeric compositions.

The term "reinforcing agent" or "reinforcing medium" applies to the mineral substances, subsequently described in detail, whenever their incorporation into a polymer system results in improved physical properties, in distinction to minerals which serve only as fillers or diluents for a polymer system. Since the reinforcement produced by the practice of this invention is achieved by chemical bonding which will be described subsequently herein, the term "reinforced polymeric composition" or "reinforced polymer" shall refer to those compositions comprising a polymer and reinforcing agent wherein the reinforcing agent is chemically bound to the polymer through a third component referred to as a coupling agent. A coupling agent is a compound containing two or more reactive groups, at least one of which is suitable for reaction with the polymer, and at least one of which is suitable for reaction with a mineral substance.

It is well known in the prior art that polymeric compositions can be "filled" with inorganic substances, i.e. inorganic materials which do not enter into the polymerization process can be mixed with the monomer feed or polymer product so as to form a uniform finished product. Initially, various fillers were used in a polymeric material to color the polymer, change the coefficient of expansion, improve abrasion resistance, modulus, and strength, and to dilute the polymer thereby lowering its cost. It was, and is now, common practice to admix a filler and polymer in several ways so as to effect a mechanical bond between the two components. One method has been to mix thoroughly a monomer and filler and subsequently polymerize the monomer, thereby producing a composition wherein the filler is intimately dispersed throughout the finished product. Another method has been to subject uncured polymer and filler to a shearing force whereby the filler is forced into some type of mechanical bond with the polymer upon curing. Various other methods of achieving mechanical bonding of filler to polymer are also well known in the art.

The upper limit of filler that can be used in mechanical mixtures without adversely affecting the physical properties of the product is low. The tensile and flexural strengths, particularly of some polymer systems, fall off sharply at relatively low concentrations of filler. An exception to this generalization has been the use of fibrous material, particularly fibrous glass particles, in polymeric compositions. The incorporation of fibrous glass into a polymer increases physical properties significantly. As yet, such improvement has not been achieved by the use of granular material. The reason for this increase in strength exhibited by granularly filled polymers is that a particulate filler in a polymer is not a component comparable to the polymer in load-bearing characteristics. Rather the polymeric constituent is primarily determinative of the tensile and flexural strengths and moduli of the composition. Therefore a filled polymeric product, which contains less polymer per unit volume of the product than an unfilled polymer, ordinarily possesses physical properties inferior to the unfilled polymer, particularly at granular filler concentrations of about 50% or more.

Efforts in the prior art have been directed toward discovering combinations of couplers, organic matrices, and inorganic reinforcement which give high mechanical strengths rather than attempting to modify inorganic materials that have desirable properties so that they can be coupled to organic polymers. For example, silica in the form of quartz sand is inexpensive, hard, strong, optically clear with low birefringence, of low density, but only slightly coupled to polymers using presently available coupling agents. Such a material when incorporated into polymers provides compositions with many desirable properties. A method which would increase the chemical coupling of quartz and other similar materials to polymer systems and thereby increase the physical properties of the finished compositions would be very valuable.

As mentioned above, not all minerals are equally effective as reinforcing agents. Aluminum silicates, bentonite and kaolinite clays, and certain types of silicas and silicates are only slightly coupled to polymers by coupling agents presently known in the art. However, such mineral silicates and siliceous particles can be effectively bound to polymers by couplers if the mineral particles are pretreated with an alkaline substance and then heated at elevated temperatures prior to incorporation into a polymeric material.

It is a primary object of this invention to provide polymeric compositions reinforced with siliceous materials.

It is a further object of this invention to provide a process for the preparation of polymeric compositions reinforced with siliceous materials.

It is an additional object of this invention to provide siliceous materials of improved coupling capability with polymeric substances.

It is still another object of this invention to provide a method for treating siliceous materials to improve their coupling capability to polymeric substances.

Additional objects, benefits and advantages will become apparent as the detailed description of the invention proceeds.

The polymeric compositions of this invention comprise a polymer, coupling agent, and a siliceous reinforcing mineral, said reinforcing mineral being chemically bound to the polymer by the coupling agent, wherein said reinforcing mineral, prior to reaction with said coupling agent is pretreated with a basic inorganic salt, oxide, or hydroxide and subsequently heated to at least 500° C.

POLYMERS

The polymers which can be reinforced according to the present invention are the synthetic high molecular weight materials produced either by addition or condensation polymerization.

An important class of polymers which are beneficially modified according to this invention are those obtained from a polymerizable monomer having a carbon-carbon double bond. Such polymers include the polyalkenes formed from monomers such as ethylene, propylene, and isobutylene; the polydialkenes formed from monomers such as butadiene and isoprene; the halogenated polyalkenes from monomers such as tetra chloroethylene and chlorotrifluoroethylene; the vinyl resins such as polyvinyl acetal, polyvinyl acetate, polyvinyl alcohol, polyvinyl butyral, polyvinyl carbazole, polyvinyl chloride and polyvinylidene chloride; the polystyrenes formed from such monomers as styrene and α-methylstyrene; and the acrylic resins formed from such monomers as acrylic acid, methacrylic acid, methyl acrylate, ethyl acrylate, methyl methacrylate, ethyl methacrylate, and acrylonitrile.

Another class of synthetic polymers capable of reinforcement are the cellulose derivatives, e.g. cellulose esters such as cellulose acetate, cellulose triacetate, cellulose acetatebutyrate, and cellulose propionate, and cellulose ethers such as methyl or ethyl cellulose, cellulose nitrate, rayon, cellophane, etc.

Acetal resins are another group of polymers capable of reinforcement. This class comprises those resins formed by the addition polymerization of formaldehyde or higher aldehydes to produce an oxymethylene or substituted oxymethylene linkage.

Resins formed by the condensation of an aldehyde with other materials can also be reinforced according to this invention. Typical resins include the phenolics, formed by the condensation of phenol, cresol, xylenol, or other hydroxy aromatic compounds with formaldehyde or other higher aldehydes; the melamine resins, formed by the condensation of melamine and formaldehyde or higher aldehydes; and resins formed by the condensation of urea with formaldehyde or higher aldehydes.

Other polymer systems which can be reinforced according to this invention include the furan resins obtained by the polymerization of furfural or furfuryl alcohol, and by copolymerization of furfural and a ketone; coumarone-indene resins; casein resins; silicone elastomers; polycarbonate resins formed by polymerization of unsaturated cyclic esters of carbonic acid such as vinylidene carbonate and allyldiglycol carbonate or by condensation of phosgene with a diol; epoxy resins formed by condensation of a halogenated alkylene oxide such as epichlorohydrin with a polyhydric compound such as ethylene glycol or bis-phenol.

A preferred class of polymers suitable for use with this invention are the polyesters. These resins are formed by reaction of a polyhydric alcohol with a saturated or unsaturated polycarboxylic acid, acid anhydride, or acyl halide. Particularly preferred are the polyesters formed from an unsaturated acid and an alkylene glycol or dialkylene glycol, which product is subsequently cross-linked by further reaction with a compound containing a $CH_2=C<$ group such as styrene, ethyl acrylate, methyl methacrylate, acrylonitrile, vinyl acetate, or acrolein.

Another preferred class of polymers are the polyurethane resins prepared by reaction of polyols, polyesters, or polyethers with a polyisocyanate such as tolylenediisocyanate. Still another preferred class of polymers are the polyamides produced by the condensation of a diamine with a dicarboxylic acid, or by the addition polymerization of cyclic amides, or by some other method. Particularly preferred polyamides are the nylons, such as nylon 6 (from ε-caprolactam) and nylon 66 (from hexamethylenediamine and adipic acid).

Another related group of polymeric constituents which can be modified to form compositions included within the scope of this invention are copolymers and terpolymers of the above groups. Examples of such polymers include polymerized butadiene/styrene, vinyl chloride/vinyl acetate, vinyl chloride/vinyloxyethanol, ethylene/maleic anhydride, butadiene/styrene/vinylbenzene, and styrene/epoxide/maleic anhydride.

The polymers may be linear or cross-linked. It has been determined that a cross-linked polymer provides some improvement in physical properties, particularly impact resistance, but linear polymers are also difinitely included within the scope of this invention. The maximum amount of tolerable cross-linking in the polymer depends upon the proposed use of the finished composition. Increased crosslinking produces compositions with higher impact resistance and somewhat diminished flexural strength and modulus. Consequently, control of cross-linking provides a variable which enables one to "tailor" the polymer in many respects to produce a composition of the desired properties. Crosslinking can be achieved through the coupler, e.g. through siloxane linkages,

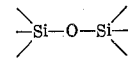

if the coupler contains an oxysilane group,

for reaction with a reinforcing mineral. Crosslinking may also be achieved in an addition polymerization by use of a polyfunctional promoter. Other suitable crosslinking agents which are known in the art can also be used. Generally those compounds which contain a multiplicity of groups capable of incorporation into a polymer chain are suitable crosslinking agents. Examples include unsaturated polyesters, divinylbenzene, bis-fumarates, bis-maleates, peroxides, polyethyleneimine, etc.

REINFORCING AGENTS

The reinforcing agents of the preesnt invention are siliceous minerals such as mineral silicates and other siliceous materials which form an alkaline surface upon treatment with a base. Also included in the term "siliceous minerals" are synthetically prepared siliceous materials such as fume silica and silica obtained by evaporation of a silica sol. Other examples of materials which acquire significantly increased coupling capability by pretreatment with a base include: quartz and other forms of silica such as silica gel, glass fibers, cristobalite, etc.; mineral silicates such as wollastonite which is a calcium metasilicate, mullite and sillimanite which are aluminum silicates, abestos such as chrysotile which is a hydrated magnesium silicate, crocidolite and other calcium magnesium silicates, and forsterite, a magnesium silicate; and clays such as kaolinite, dickite, nacrite, beidellite, bentonite, hectorite, montmorillonite, nontronite, saponite, and attapulgite.

The amount of reinforcing agent to be used in the preparation of the polymeric compositions varies over a very wide range with the maximum content being limited primarily by the ability of the polymer to bind the reinforcing medium into a cohesive mass. Techniques subsequently described herein have enabled me to prepare polymeric compositions containing as much as 90 or 95% by weight reinforcing agent.

The lower range of reinforcing mineral concentration is limited only insofar as it is necessary to have sufficient mineral present to effect an improvement in physical properties of the polymeric composition. Consequently, mineral concentrations as low as 5% by weight or less can be used, particularly if the finished composition has been extruded into filament form. A preferable lower limit for the mineral reinforcing agent, especially in the case of molded compositions, is 40% by weight of the total composition, and more preferably 50% by weight. Suitable values, therefore, for reinforcing agent concentration in the finished composition range from about 5 to 95%, preferably from about 40 to 95%, and more preferably from about 50 to 90% by weight.

Particle shape and size of the reinforcing agent affect the physical properties of the finished composition. In a preferred aspect of this invention, the reinforcing mineral is admixed with a monomer or prepolymer and subsequently cast into a mold where the polymer is formed and cured. In such a method, the viscosity of the monomer or prepolymer-mineral slurry becomes a limitation on the maximum amount of reinforcing agent which can be used, i.e. too high a mineral concentration produces mixtures too viscous to cast into molds. This limitation on mineral concentration imposed by the viscosity is in turn dependent upon the shape of the particulate mineral. For example, spherical particles do not increase the viscosity of the monomer mixture as much as fibrous material. By adjusting the particle shape of a mineral reinforcer and thereby controlling the viscosity of the monomer mixture, it is possible to prepare improved castable or moldable polymeric compositions containing a very large amount of reinforcing mineral.

Another factor which has an effect on the upper limit of mineral concentration is the particle size distribution of the mineral. A wide distribution of particle sizes provides a composition with a small amount of voids or spaces between the particles, thereby requiring less polymer to fill these spaces and bind the particles together. Proper combination of the two variables of particle shape and size distribution enables me to prepare the highly reinforced compositions of this invention.

Particle size distribution as previously noted, is a variable which has an effect upon the degree of mineral loading possible. Regarding particle size, generally particles which pass through a 60 mesh screen (250 microns in the smallest diameter) are small enough to be used in compositions of this invention although particles as large as 1000 microns (18 mesh) can be used with equal or nearly equal success; regarding a lower limit on particle size, particles as small as 0.5 micron have been successfully employed and particles in the 200 to 400 mµ range can also be used. More descriptive of suitable mineral particles than limits on particle size is in specification of particle size distribution. A suitable wide particle size distribution is as follows:

Percent:
- 100 _____ 250µ or less (60 mesh).
- 90 _____ 149µ or less (100 mesh).
- 50 _____ 44µ or less (325 mesh).
- 10 _____ 5µ or less.

A narrower distribution also suitable for use in this invention is:

Percent:
- 100 _____ 62µ or less (230 mesh).
- 90 _____ 44µ or less (325 mesh).
- 50 _____ 11µ or less.
- 10 _____ 8µ or less.

A relatively coarse mixture useful in this invention has the following particle size distribution:

Percent:
- 100 _____ 250µ or less (60 mesh).
- 90 _____ 149µ or less (100 mesh).
- 50 _____ 105µ or less (140 mesh)
- 10 _____ 44µ or less (325 mesh).

A finely divided mixture has the following particle size distribution:

Percent:
- 100 _____ 44µ or less (325 mesh).
- 90 _____ 10µ or less.
- 50 _____ 2µ or less.
- 10 _____ 0.5µ or less.

These figures regarding particle size distribution should not be construed as limiting since both wider and narrower ranges of distribution will also be useful as well as both coarser and finer compositions. Rather these figures are intended as representative illustrations of mineral compositions suitable for use in the reinforced polymeric compositions of this invention.

The reinforcing agents perform a dual function in the finished compositions. First, depending upon the material selected, they may serve as an inexpensive diluent for the polymer, thereby lowering the cost of the final product. Secondly and more important, these minerals, when bound to the polymer in accordance with this invention, produce compositions with physical properties far superior to those of unreinforced polymers, thereby permitting their use in applications heretofore unsuited for the unreinforced polymers.

To achieve the benefits of this invention, namely the production of easily castable or moldable highly reinforced polymeric compositions plus lower cost from higher loadings of reinforcing minerals, it is necessary that the reinforcing agent be substantially granular in shape rather than fibrous. However, a small amount of fibrous material may be incorporated into a polymer system if the amount of granular material is reduced by some proportionately larger amount. Alternatively, if castability is not required, larger amounts of fibrous material can be included in the composition, thereby reinforcing the final product to an even greater extent.

The most common fibrous reinforcing agent used is fibrous glass particles. These fibers are most easily incorporated into the polymeric compositions when chopped into strands approximately 0.5 to 3.0 inches in length, pretreated with the base, heated, and then either added to a prepolymer mix as discrete particles or formed into a mat upon which the prepolymer is poured prior to polymerization. Such methods of incorporation of glass fibers are well known in the art and are mentioned here to demonstrate that the granularly reinforced polymers of this invention can be additionally reinforced by incorporation of fibrous materials according to techniques well known in the art or according to the procedure described herein as applicable to granular siliceous particles.

PRETREATMENT AND COUPLING

Bonding of the reinforcing medium to the polymer is achieved by carrying out several necessary steps. The first step inovlves pretreating the mineral with an inorganic base, heating the mineral, and reacting this treated mineral with a coupling agent. The mineral-coupler adduct so formed is then either reacted with a formed polymer or is added to a monomer or prepolymer and polymerized so that the polymer-reactive radical of the coupler is chemically incorporated into the polymer chain. The term "inorganic base" includes all inorganic materials which, upon addition to water, give a solution having a pH greater than 7.

Bases suitable for use in pretreating the inorganic mineral are the basic inorganic salts, oxides, and hydroxides such as ammonium hydroxide, zinc hydroxide, zinc oxide, and trisodium phosphate. Preferred basic materials are the alkali metal and alkali earth metal oxides, hydroxides, carbonates, and bicarbonates, such as lithium hydroxide, sodium carbonate, potassium bicarbonate, magnesium hydroxide, calcium oxide, barium hydroxide, and calcium carbonate. Quantities of a base necessary to achieve optimum coupling are expressed in terms of weight percent of the mineral present and may vary from 0.05% or less up to 25% or more, depending upon the particular base used and the reinforcing medium to be treated. A preferred range for the alkaline earth metal hydroxides when used to treat various forms of silica is 0.05% to 5.0%. The treatment of the mineral with a base is preferably carried out by contacting the mineral and base in an aqueous or alcoholic medium; the mineral is then filtered and heat-treated at 500 to 1000° C. or more, preferably 1000° or more, for at least fifteen minutes, thereby placing the treated mineral in improved condition for coupling to the polymer. Improved coupling of a mineral to a polymer can be obtained solely by heating an untreated siliceous material at an elevated temperature prior to reacting it with a coupling agent, or solely by treating a siliceous material with a base and drying it at 100 to 150° C. However much more significant improvement is achieved by the basic treatment of the siliceous material in combination with the heating prior to coupling.

Coupling is achieved by means of a coupling agent which contains at least one group capable of reaction with the monomer during polymerization and at least one group capable of reaction with the reinforcing mineral.

A preferred type of coupling agent is one which contains at least one substituted oxysilane group, i.e.

where R is a radical which can be removed upon hydrolysis to leave a silanol group

In the absence of any added water, the mineral and coupler can be joined by mixing them thoroughly. Presumably, reaction takes place between hydroxyl radicals present on the surface of the mineral and between the substituted oxysilane groups of the preferred coupler to form a connective linkage in the following manner:

Theoretically hydroxyl groups are present on the surface of, or can be deposited on the surface of, most metallic and siliceous substances, thereby providing a site available for reaction with the siloxy groups of the coupler.

In some cases, it is desirable to add a small amount of water upon mixing the mineral and coupler together to assure complete reaction. Apparently water hydrolyzes the R group of the oxysilane, leaving a more reactive silanol group available for reaction with hydroxyl groups attached to the surface of the mineral. The reluctance of some materials, such as alumina, to acquire surface hydroxyl groups may explain why they are not themselves chemically bound to the polymer and require mixing with other minerals which can be so bound to produce compositions of high strength and modulus. This theory of availability of hydroxyl groups on the mineral surface may also explain why many silicon-containing minerals are preferred reinforcing agents for use in this invention since reaction of the siloxy groups of the coupler with the silanol groups, i.e.

of the reinforcing agent produces the very stable siloxane linkage,

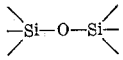

Regardless of any theoretical explanation advanced herein to which I do not intend to be bound, the mineral-reactive group is attached to the treated mineral and this composition is subsequently dried. A chemical bond between the mineral and coupler is thus obtained.

A chemical group capable of reaction with a polymer is an essential part of the coupling agent since it provides the means whereby the modified mineral is connected through a chemical bond to the polymer. The type of reactive group is of course dependent upon the particular polymer used in the composition. For example, an epoxy-containing coupling agent is a compound suitable for reaction with an epoxy resin. Vinyl, acrylic, or methacrylic-containing coupling agents are suitable for use with vinyl, acrylic, alkene, styrene, and in general those resins formed from monomers containing a $>C=C<$ group. Resins such as the epoxies, furans, phenolics, melamine/formaldehydes, urea/formaldehydes, urethanes and amides can be coupled to a reinforcing medium through an amino-containing coupling agent. Resins such as the alkyl celluloses and cellulose organic esters can be coupled to a reinforcing medium through an epoxy-containing coupling agent. In addition, certain resins can be modified by incorporation of a reactive group into the polymer chain during polymerization. The coupling agent is then selected so that it is capable of reaction with the group incorporated into the polymer chain. Such "tailoring" or selective copolymerization of the polymer molecule is desirable when a stable chemical bond cannot be readily attained between the polymer and coupler. An example of a tailored polymer is found in German Patent 1,108,433, wherein epoxy groups are incorporated into a polycarbonate resin by the reaction of phosgene, bis-phenol A, and epichlorohydrin. A reinforced epoxy-capped polycarbonate can be obtained by adding a reinforcing agent treated with an epoxy or amino-containing coupling agent to the monomer or prepolymer mixture and subsequently polymerizing the mixture. Other examples of "capping" or selective copolymerization will become apparent to those skilled in the art in view of this disclosure.

The third component of this coupling agent is a linkage between the polymer-reactive and mineral-reactive groups. The main function of such a linkage is to provide a stable chemical bond between the two groups. In some cases, the two groups form a stable bond directly between themselves, thereby making an intervening linkage unnecessary. An example of such a compound is vinyl triethoxysilane wherein the vinyl group is the polymer-reactive component and the triethoxysilane group is the mineral-reactive component. Other couplers, for instance those containing amino groups together with substituted oxysilane groups, are more stable if the groups are connected through some linkage such as an alkylene radical containing from 2 to 9 carbon atoms, and preferably 3 to 4 carbon atoms. Examples of such coupling agents include $NH_2—CH_2CH_2CH_2—Si(OR)_3$ and
$NH_2—CH_2CH_2CH_2—NH—CH_2CH_2CH_2—Si(OR)_3$, wherein each R can be an alkyl, alkenyl, alkynyl, aryl, alkaryl, aralkyl, or acyl radical.

In addition to the coupling agents described above, other compounds are also available for use as coupling agents. One suitable class of coupling agents includes compounds of the general formula

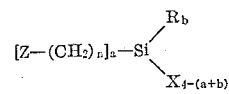

where Z is a radical interpolymerizable with a monomer or reactive with a polymer, examples being primary and secondary amino, secondary amido, epoxy, isocyanato, hydroxyl, acyl, alkoxycarbonyl, aldehydic, ketonic, vinyl, allyl, acrylic, methacrylic, and other radicals containing ethylenic unsaturation; where R is an organic radical; where X is a radical capable of reaction with the surface of a mineral, examples being halogen, alkoxy, cycloalkoxy, aryloxy, alkoxycarbonyl, aryloxycarbonyl, alkyl carboxylate, aryl carboxylate, and hydroxyl radicals; where $n$ is an integer from 0 to about 9; where $a$ is an integer from 1 to 3; and where $b$ is an integer from 0 to 2, provided that the sum of $a+b$ does not equal more than 3. Examples of compounds of the above formula include: 3-aminopropyl trichlorosilane; N-methyl-$\beta$-amidoethyl trimethoxysilane; 3,4-epoxybutyl tricyclohexyloxysilane; 3-isocyanatopropyl methyl diphenoxysilane; di-($\beta$-hydroxyethyl)dimethoxycarbonylsilane; di-($\beta$-acetylethyl)diphenoxylcarbonylsilane; 3-(methoxycarbonyl)propyl) triacetosilane; divinyl dibenzoic silane; allyl trihydroxysilane; 3-acrylatopropyl triethoxysilane; 3-methacrylatopropyl dimethyl hydroxysilane; p-trimethoxysilyl styrene; $\beta$-trimethoxysilyl)propionaldehyde; and trimethoxysilyl acetone.

Other compounds useful as coupling agents include the coordinated chromium complexes which contain at least one polymer-reactive radical such as primary or secondary amino, secondary amido, epoxy, isocyanato, hydroxyl, acyl, alkoxycarbonyl, aldehydic, ketonic, vinyl, allyl, acrylic, methacrylic, or other radicals containing ethylenic unsaturation, and at least one mineral-reactive radical such as halogen, alkoxy, cycloalkoxy, aryloxy, alkoxycarbonyl, aryloxycarbonyl, alkyl carboxylate, aryl carboxylate, and hydroxyl radicals. Examples include methacrylato chromic chloride, acrylato chromic chloride, $\epsilon$-aminocaproato chromic chloride, isocyanato chromic chloride, resorcylato chromic chloride, crotonato chromic chloride, sorbato chromic chloride, 3,4-epoxybutyl chromic chloride, and methacrylato chromic hydroxide. Such compounds are useful as coupling agents as are other organo-silicon compounds, olefinic isocyanates, substituted amines and amine salts, and other compounds which can be produced to contain a mineral-reactive radical and a polymer-reactive radical. Examples of such compounds include allyl isocyanate, allyl chloride, sodium methacrylate, 4-aminobutanol-1, and the methyl ester of 1,2-epoxybutanoic acid.

The amount of coupler used to treat the reinforcing agent is relatively small. As little as one gram of coupling agent per 1000 grams of reinforcing agent can be used to produce a polymeric composition with physical properties superior to those of the polymeric composition containing uncoupled filler. Generally quantities of coupler in the range of 3.0 to 20.0 grams per 1000 grams of reinforcing agent have been found most satisfactory although quantities in excess of that range may also be used with no detriment to the properties of the finished product.

PROCESS

Polymerizations are carried out by methods well known to those skilled in the art using appropriate catalysts, promoters, regulators, stabilizers, inhibitors, curing agents, etc., in combination with temperatures and pressures best suited to achieve the polymerization of the selected monomer or monomers.

The reinforced polymeric compositions of this invention can be prepared in several ways. An adduct comprising a treated reinforcing agent and coupler bound thereto may be incorporated into an uncured polymerized product under appropriate conditions by intimate mixing in a device such as a Banbury mixer, mill roll, or by some other method which subjects the uncured polymer and treated mineral to a shearing force, thereby effecting a dispersion of the reinforcing agent in the polymer. This method is particularly useful for reinforcement of modified natural resins such as the cellulose ethers and esters and for reinforcement of polyalkenes produced by a highly pressurized process.

Another method of reinforcement comprises mixing the monomer or prepolymer with an appropriate coupler and polymerizing the mixture, thereby producing a modified polymer with chemical groups capable of reaction with a reinforcing agent. The mineral-reactive polymer and base-treated reinforcing agent are then reacted to produce a highly reinforced polymeric composition.

A preferred method of reinforcing a polymer comprises first treating the reinforcing mineral with a base, heating the mineral, and then mixing it with the monomer or prepolymer, coupling agent, and appropriate catalysts, modifiers, promoters, etc., casting the mixure into a mold, and then polymerizing the mixture. This method is particularly advantageous in preparing compositions comprising a large proportion of granular reinforcing medium, e.g., 75% by weight or more. Alternatively, the reinforcing mineral, following treatment with a base and subsequent heat treatment, may be reacted with a coupling agent prior to incorporation into the monomer or prepolymer slurry.

Other processing techniques applicable to the practice of this invention include compression molding, transfer molding, and injection molding. To obtain injection molded compositions, it is necessary to employ a thermoplastic polymer reinforced with granular, and preferably spherical, mineral particles.

In the prepartion of castable compositions it may be advisable, particularly in the case of high loadings of reinforcing agents where a slight increase in viscosity of the monomer-mineral mixture cannot be tolerated, to provide means for injection of the catalyst (or alternately a promoter) into the monomer as it is being poured into the mold. Such a technique prevents an increase in viscosity of the monomer mixture due to polymerization until the mixture is cast.

Another technique useful with high loadings of reinforcing agents, which aids in overcoming the difficulties presented by high viscosity is that which employs a pressurized injection of the monomer mixture into the mold.

A technique which has been found useful in decreasing the viscosity of monomer-mineral slurries comprises adding a small amount of a surface-active agent to the slurry. Such a decrease in viscosity is advantageous for two reasons. It permits the formation of a finer, smoother finish on the final product. Normally a finished composition with a high content of reinforcing mineral, e.g. 75% mineral, is likely to have a granular or coarse texture and may even contain voids or open spaces due to the inability of the viscous mixture to flow together completely prior to polymerization. The addition of a surface-active agent eliminates this problem and produces a smooth, attractive finish on highly reinforced compositions. Alternately, if a smooth finish is not a necessary feature for certain applications, then a decrease in viscosity permits incorporation of larger amounts of reinforcing agent into the monomer feed. The surface-active agent may be either anionic, cationic, nonionic or mixtures thereof. Examples include zinc stearate, dioctadecyl dimethyl ammonium chloride, and ethylene oxide adducts of stearic acid. Preferred compounds are the metal and quaternary ammonium salts of long-chain carboxylic acids. A concentration of surfactant in the range of 0.05% to 0.5% by weight of the total composition has been found useful. At concentrations of surface-active agent higher than 0.5%, it may be necessary to use additional catalyst and promoter. Concentrations lower than 0.05% may also be used but with somewhat diminished results.

The above techniques, either singly or in combination with one another or with other techniques known in the art, are useful in obtaining the highly reinforced compositions of this invention.

Utilization of the procedures described above and in the following examples permits the preparation of granularly reinforced polymeric compositions possessing flexural strengths at least 25% greater than the corresponding unreinforced polymers. Since the strengths of a filled polymer do not increase and often decrease with increasing concentrations of filler above 50%, even more significant improvement is achieved at higher mineral concentrations, e.g. 60% by weight and greater.

The invention will be more clearly understood from the detailed description of the following specific examples which set forth some of the preferred compositions, the methods of preparing them, and the superior physical properties attained by the practice of this invention.

*Example 1*

A quantity of 100 grams of silica obtained from the acidification and evaporation of a silica aquasol (Syton 200) was heated for four hours at 1000° C. A quantity of 65 grams of this silica was then added to a mixture containing 35 grams of a 70/30 blend of unsaturated polyester/styrene prepolymer (Paraplex P–43), 0.7 gram of 3-methacrylatopropyl trimethoxysilane, and 0.7 gram of a 50/50 blend of benzoyl peroxide and tricresyl phosphate. This mixture of putty-like consistency was milled for three minutes on unheated rolls, then placed in a mold and polymerized at 500 p.s.i. and 110° C. for ten minutes. The composition was cured for twenty hours at 110° C. The finished composition, designated Sample 1a in Table 1 below, contained 65% by weight silica.

Sample 1b in Table 1 below was prepared according to the above procedure except that the silica was heated to 500° C. The silica in Sample 1c was heated to 130° C. The flexural strength and modulus were determined in accordance with ASTM test D–790–61. The proportions of reinforcing mineral and silane coupler are expressed as weight percent or volume fraction of the total composition.

Example 2

A quantity of 160 grams of novacite silica (a finely divided silica with a particle size distribution in the 1 to 10μ range) was added to 500 ml. of an aqueous solution containing 0.32 gram of barium hydroxide. The slurry was stirred for twenty minutes at room temperature and then filtered. The treated silica was dried at 150° C. for four hours and then added to a mixture containing 40 grams of a 70/30 unsaturated polyester/styrene prepolymer (Paraplex P–43), 0.8 gram of a 50/50 blend of benzoyl peroxide and tricresyl phosphate, and 0.8 gram of 3-methacrylatopropyl trimethoxysilane. This mixture of putty-like consistency was milled for three minutes on unheated rolls, and placed in a mold and polymerized at 500 p.s.i. and 110° C. for ten minutes. The composition was cured for twenty hours at 110° C. The cured composition contained 80% by weight silica. Evaluation results are reported below as Sample 2.

Example 5

The procedure of Example 3 was followed except that 5 grams of magnesium hydroxide was used in place of calcium hydroxide.

Example 6

To 700 ml. of water containing 6 grams of calcium hydroxide was added 100 grams of silica obtained from the acidification and evaporation of a silica aquasol (Syton 200). This slurry was stirred for about 20 minutes at room temperature and then filtered. The treated silica was heated for four hours at 1000° C. A quantity of 65 grams of this silica was then added to a mixture containing 35 grams of U–43 polyester prepolymer, 0.7 gram of 3-methacrylatopropyl trimethoxysilane, and 0.7 gram of the benzoyl peroxide catalyst. This mixture was milled and polymerized as described in Example 3. The finished composition, Sample 6a, contained 65% by weight silica. Sample 6b in Table 2 below was prepared according to

TABLE 1

| Sample No. | Reinforcing Agent | | Silane Coupler, Percent wt. of comp. | Heat Treatment °C. | Flexural Strength, p.s.i.×10⁻³ | Flexural Modulus, p.s.i.×10⁻⁵ |
|---|---|---|---|---|---|---|
| | Mineral | Percent wt. | Vol. frac. | | | |
| 1a | Silica | 65 | .50 | 0.7 | 1,000 | 13.5 | 2.0 |
| 1b | ...do | 65 | .50 | 0.7 | 500 | 10.4 | 1.9 |
| 1c | ...do | 65 | .50 | 0.7 | 130 | 4.7 | 1.2 |
| 2* | ...do | 80 | | 0.8 | 150 | 11.1 | 3.0 |

*Pretreatment of silica with solution of Ba(OH)₂; Ba(OH)₂ equal to 0.2% weight of the silica was used.

The above data for Samples 1a, b, and c demonstrate the improvement in coupling as manifested by increased flexural strength and modulus, obtained solely by heating the silica to 1000° C. for four hours as compared to compositions containing silica heated to 500° or 130° C. for a similar time. Sample 2 shows that reinforcement can be obtained solely by basic pretreatment of the reinforcing agent without an accompanying heat reatment. Subsequent data presented in Table II show the marked improvement in reinforcement achieved by combining the basic pretreatment with a heat treatment at elevated temperatures.

Example 3

A slurry of 750 ml. of water, one gram of calcium hydroxide, and 160 grams of 325+ mesh quartz was stirred for about 20 minutes at room temperature and then filtered. The treated quartz was heated for 4 hours at 1000° C. and then added to a mixture containing 40 grams of a 70/30 unsaturated polyester/styrene prepolymer (Paraplex P–43), 0.8 gram of a 50/50 blend of benzoyl peroxide and tricresyl phosphate, and 0.8 gram of 3-methacrylatopropyl trimethoxysilane. This mixture of putty-like consistency was milled for three minutes on unheated rolls, and placed in a mold and polymerized at 500 p.s.i. and 110° C. for ten minutes. The composition was cured for twenty hours at 110° C. The cured composition, designated Sample 3a in the table below, contained 80% by weight quartz.

Sample 3b in Table 2 below was prepared according to the above procedure except that the quartz was not pretreated with calcium hydroxide; Sample 3c contains pretreated quartz but no coupling agent; Sample 3d is a quartz-filled polyester comprising untreated quartz in the absence of a coupler.

Example 4

The procedure of Example 3 was followed except that 5 grams of barium hydroxide was used as the pretreating agent instead of calcium hydroxide.

the procedure described above except that the silica was not pretreated with calcium hydroxide.

Example 7

In this example, the effect of concentration of calcium hydroxide on the physical properties of a reinforced polyester was demonstrated. The procedure described in Example 3 was followed except that novacite silica was used in place of the quartz. Novacite silica is a finely divided silica with a particle size distribution in the 1–10 micron range. The concentration of calcium hydroxide in the aqueous solution was varied according to the following tabulation: (a) 0%; (b) 0.006%; (c) 0.06%; (d) 0.12%; (e) 1.2%; and (f) 5.0%.

Example 8

The procedure described in Example 3 was followed except that a reinforcing medium consisting of 100 grams of quartz (325+ mesh) and 60 grams of neonovacite silica (less than 1μ diameter) was used and the alkaline pretreatment was carried out in an alcoholic solution of potassium hydroxide containing 4 grams of potassium hydroxide per 100 ml. of alcohol. The finished composition contained 80% by weight reinforcing agent.

Sample 8b was prepared in a similar manner except that the reinforcing agent was not pretreated with alcoholic potassium hydroxide.

Example 9

The procedure described in Example 3 was followed except that 325+ mesh mullite was used instead of the quartz and only 30 grams of the polyester prepolymer was employed. The finished composition contained 84% by weight reinforcing agent.

Sample 9b was prepared in a similar manner except that the mullite was not pretreated with calcium hydroxide.

Example 10

In this example, the physical properties of the finished polymeric compositions are demonstrated. The table below gives flexural strengths and moduli for polyester compositions prepared according to this invention. The flexural strength and modulus values were determined in accordance with ASTM test D-790-61. The numerical designations of polyester compositions indicate compositions prepared in the manner described in the corresponding examples. Proportions of reinforcing agent and silane coupler are expressed in terms of weight percent or volume fraction of the total composition. There was also an accompanying heat treatment of the reinforcing agent for four hours at 1000° C.

filler, i.e. with additional inorganic particulate material which is not chemically bound to the polymer as is the reinforcing agent. As an example, a mold may be loosely filled with a mixture of large (approximately 1 cm. in diameter) irregular mineral particles and sand, and a monomer-mineral slurry as described in the preceding examples may be poured into the mold, thereby "wetting" the large particles in the mold and filling the spaces between the particles before polymerization occurs. In such a case, the reinforced polymer binds the sand and larger aggregates together in much the same way as cement binds sand and gravel together to form a finished concrete. As an alternate method, it is anticipated that the mineral aggregate in the mold may be pretreated with a base, heated, and reacted with a suitable coupling agent prior to the introduction of the monomer-mineral slurry so that upon casting, the entire mineral mixture is chemically bound to the polymer, thereby producing a reinforced composition wherein the reinforcing medium may exceed 95% of the total composition.

TABLE 2.—PHYSICAL PROPERTIES OF FILLED AND REINFORCED POLYESTER (P-43) COMPOSITIONS

| Sample No. | Reinforcing Agent | | | Silane Coupler, Percent wt. | Base | | Flexural Strength, p.s.i.×10$^{-3}$ | Flexural Modulus, p.s.i.×10$^{-6}$ |
|---|---|---|---|---|---|---|---|---|
| | Mineral | Percent wt. | Vol. frac. | | Compound | Percent wt. of reinforcing agent | | |
| 3a | Quartz | 80 | .65 | 0.4 | Ca(OH)$_2$ | 1.0 | 21.2 | 3.6 |
| 3b | do | 80 | .65 | 0.4 | | 0 | 13.1 | 3.5 |
| 3c | do | 80 | .65 | 0 | Ca(OH)$_2$ | 1.0 | 14.8 | 3.5 |
| 3d | do | 80 | .65 | 0 | | 0 | 9.3 | 3.1 |
| 4 | do | 80 | .65 | 0.4 | Ba(OH)$_2$ | 3.1 | 20.6 | 3.5 |
| 5 | do | 80 | .65 | 0.4 | Mg(OH)$_2$ | 3.1 | 19.3 | 3.5 |
| 6a | Silica | 65 | .50 | 0.7 | Ca(OH)$_2$ | 6.0 | 18.0 | 3.5 |
| 6b | do | 65 | .50 | 0.7 | | 0 | 13.5 | 3.0 |
| 7a | Novacite | 80 | .65 | 1.0 | | 0 | 13.9 | 3.0 |
| 7b | do | 80 | .65 | 1.0 | Ca(OH)$_2$ | 0.006 | 12.5 | 3.0 |
| 7c | do | 80 | .65 | 1.0 | Ca(OH)$_2$ | 0.06 | 12.0 | 3.1 |
| 7d | do | 80 | .65 | 1.0 | Ca(OH)$_2$ | 0.12 | 17.8 | 3.6 |
| 7e | do | 80 | .65 | 1.0 | Ca(OH)$_2$ | 1.2 | 15.0 | 3.5 |
| 7f | do | 80 | .65 | 1.0 | Ca(OH)$_2$ | 5.0 | 10.2 | 3.3 |
| 8a | Quartz/neo-novacite | 86.8 | .75 | 1.0 | Alc.KOH | | 15.3 | 4.2 |
| 8b | do | 87.2 | .76 | 1.0 | | 0 | 13.3 | 3.7 |
| 9a | Mullite | 84 | .68 | 0.4 | Ca(OH)$_2$ | 0.02 | 19.7 | 4.8 |
| 9b | do | 82 | .66 | 0.4 | Ca(OH)$_2$ | 0 | 13.8 | 3.7 |

Samples 1a, 1b, and 1c show the increased reinforcement obtained solely by heat treatment of a siliceous reinforcement agent. Sample 2 shows the reinforcement obtained by a basic pretreatment without an accompanying heat treatment at elevated temperatures.

Samples 3a, b, c and d demonstrate the superior reinforcement achieved by alkaline pretreatment of a siliceous material followed by heat treatment at 1000° C. Samples 4 and 5 show that alkaline pretreatment with alkali earth metal compounds other than calcium compounds also provide reinforcement superior to that obtained by silane coupling alone. Samples 6a and b demonstrate the same type of improvement with another form of silica. Samples 7a to 7f indicate that there is an optimum level of base which should be used to treat reinforcing minerals to achieve maximum reinforcement. This level varies depending upon the material to be treated and upon the alkaline material used in the treatment. Samples 8a and b demonstrate that improved reinforcement can be obtained by the use of bases other than alkali earth metal compounds. Samples 9a and 9b demonstrate the significant improvement in physical properties obtained by pretreatment of a metal silicate prior to coupling to a polymer system.

The improved physical properties of the reinforced polymers permit their use in many applications in which the unreinforced polymers are unsuitable, such as the fabrication of tables, chairs, drawers, and other furniture and furniture components, heavy duty equipment housings, automobile parts, and building construction components. Further, the compositions of this invention are generally useful in those applications in which unreinforced polymers have been useful but where increased strength and rigidity are desirable features.

Although the invention has been described in terms of specified embodiments which are set forth in considerable detail, it should be understood that this was done for illustrative purposes only, and that the invention is not necessarily limited thereto since alternative embodiments and operating techniques will become apparent to those skilled in the art in view of this disclosure. For instance, it is possible to "fill" these compositions with a mineral Accordingly, these and other modifications are contemplated which can be made without departing from the spirit of the described invention.

What is claimed is:

1. A reinforced polymeric composition comprising a polymer, from about 5 to 95% by weight of a siliceous reinforcing agent, and from about 0.1 to about 2 parts by weight per hundred parts of said reinforcing agent of an organosilane coupling agent having at least one functional group capable of reaction with the monomer during polymerization and at least one functional group capable of reaction with said reinforcing agent, said reinforcing agent being chemically bound to the polymer by said coupling agent, wherein said reinforcing agent, prior to reaction with said coupling agent, is pretreated with a compound selected from the group consisting of basic inorganic salts, oxides, and hydroxides and subsequently heated to at least 500° C.

2. A reinforced polymeric composition according to claim 1 wherein said polymer is a polyester.

3. A reinforced polymeric composition according to claim 1 wherein said polymer is a polyamide.

4. A composition according to claim 3 wherein said polyamide is produced by the base-catalyzed, substantially anhydrous polymerization of ε-caprolactam.

5. A reinforced polymeric composition according to claim 1 wherein said polymer is an epoxy resin.

6. A reinforced polymeric composition according to claim 1 wherein said polymer is produced by polymerization of a monomer containing ethylenic unsaturation.

7. A reinforced polymeric composition according to claim 1 wherein said polymer is polystyrene.

8. A reinforced polymeric composition according to claim 1 wherein said reinforcing mineral comprises from about 40% to about 95% by weight of the total composition.

9. A reinforced polymeric composition according to claim 1 wherein said reinforcing mineral comprises from about 50% to about 90% by weight of the total composition.

10. A reinforced polymeric composition according to claim 1 wherein said compound used to pretreat said reinforcing agent is selected from the group consisting of alkali earth metal salts, oxides, and hydroxides and subsequently heated to at least 500° C.

11. A reinforced polymeric composition according to claim 1 wherein said reinforcing agent, prior to reaction with said coupling agent, is pretreated with calcium hydroxide and subsequently heated to at least 500° C.

12. A reinforced polymeric composition according to claim 1 wherein said reinforcing agent, prior to reaction with said coupling agent, is pretreated with barium hydroxide and subsequently heated to at least 500° C.

13. A reinforced polymeric composition according to claim 1 wherein said reinforcing agent, prior to reaction with said coupling agent, is pretreated with magnesium hydroxide and subsequently heated to at least 500° C.

14. A reinforced polymeric composition according to claim 1 wherein said reinforcing agent is pretreated with a compound selected from the group consisting of alkali metal salts, oxides, and hydroxides, and subsequently heated to at least 500° C.

15. The process of preparing polymeric compositions which comprises (1) treating a siliceous reinforcing agent in an aqueous or alcoholic medium with a compound selected from the group consisting of basic inorganic salts, oxides and hydroxides, and heating said reinforcing agent which has been treated to at least 500° C.; (2) reacting said agent to form an adduct with from about 0.1 to about 2% by weight of an organosilane coupling agent, said coupling agent having at least one group capable of reaction with the reinforcing mineral and at least one group capable of interpolymerization into the polymer during polymerization; and (3) conducting a polymerization in the presence of from about 5 to about 95% by weight based on the total composition of said adduct so that the interpolymerizable group of the adduct is thereby incorporated into the polymer molecule.

16. A process according to claim 15 wherein said reinforcing agent which has been treated is reacted with the coupling agent in the presence of the monomer-catalyst mixture.

17. A process according to claim 15 wherein said reinforcing agent which has been treated is reacted with the coupling agent prior to addition of the monomer-catalyst mixture.

References Cited

UNITED STATES PATENTS

| | | | |
|---|---|---|---|
| 2,507,465 | 5/1950 | Ayers | 106—309 |
| 2,739,904 | 3/1956 | Frey | 106—288 |
| 2,751,369 | 6/1956 | Te Grotenhuis | 264—41 |
| 3,131,148 | 4/1964 | Taulli | 106—287 |
| 3,158,519 | 11/1964 | Shannon et al. | 156—180 |
| 3,207,699 | 9/1965 | Harding et al. | 252—431 |
| 3,232,788 | 2/1966 | Marzocchi et al. | 117—100 |

OTHER REFERENCES

E. P. Plueddemann et al., Proceedings 17th Annual Technical Conference, 1962, Society of the Plastics Industry, Reinforced Plastics Division. Section 14A, pp. 1, 2 and 9 relied upon.

B. M. Vanderbilt and J. J. Jaruzelski, 17th Annual Technical Conference, 1962, Society of the Plastics Industry, Reinforced Plastics Division. Section 10D, pp. 1–15 relied upon.

MORRIS LIEBMAN, *Primary Examiner.*

J. E. CALLAGHAN, *Assistant Examiner.*

UNITED STATES PATENT OFFICE
CERTIFICATE OF CORRECTION

Patent No. 3,328,339                                            June 27, 1967

Paul A. Tierney

It is certified that error appears in the above identified patent and that said Letters Patent are hereby corrected as shown below:

Column 1, line 71, "increase" should read -- decrease --. Column 9, line 33, "maxing" should read -- mixing --. Column 12, line 14, "U-43" should read -- P-43 --.

Signed and sealed this 10th day of March 1970.

(SEAL)
Attest:

Edward M. Fletcher, Jr.                            WILLIAM E. SCHUYLER, JR.
Attesting Officer                                            Commissioner of Patents